(12) United States Patent
Popp et al.

(10) Patent No.: US 6,375,597 B1
(45) Date of Patent: Apr. 23, 2002

(54) PROCESS FOR CONTROLLING AN AUTOMATIC GEARBOX

(75) Inventors: Christian Popp, Kressbronn; Hansjörg Rosi, Meckenbeuren, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/554,355

(22) PCT Filed: Nov. 9, 1998

(86) PCT No.: PCT/EP98/07137
  § 371 Date: May 12, 2000
  § 102(e) Date: May 12, 2000

(87) PCT Pub. No.: WO99/25996
  PCT Pub. Date: May 27, 1999

(30) Foreign Application Priority Data

Nov. 14, 1997 (DE) .......................... 197 50 447

(51) Int. Cl.⁷ .......................... F16H 59/60; B60K 41/02
(52) U.S. Cl. .......................... 477/97; 477/111; 477/64
(58) Field of Search .......................... 477/111, 97, 61, 477/64, 65, 154, 155; 701/55, 56

(56) References Cited

U.S. PATENT DOCUMENTS

| | | | | |
|---|---|---|---|---|
| 4,648,291 A | * | 3/1987 | Klatt et al. ............... | 477/80 X |
| 4,858,499 A | * | 8/1989 | Ito et al. ................. | 477/63 |
| 4,947,330 A | * | 8/1990 | Hiramatsu ................. | 701/55 |
| 4,976,170 A | * | 12/1990 | Hayashi et al. ............ | 477/43 |
| 5,014,573 A | * | 5/1991 | Hunter et al. ............. | 477/61 |
| 5,036,729 A | * | 8/1991 | Nitz et al. ............... | 477/148 |
| 5,072,390 A | * | 12/1991 | Lentz et al. .............. | 477/154 X |
| 5,157,609 A | | 10/1992 | Stehle et al. ............. | 364/424.1 |
| 5,674,151 A | * | 10/1997 | Schepper et al. .......... | 477/154 X |
| 5,683,328 A | * | 11/1997 | Schepper et al. .......... | 477/154 X |
| 5,954,776 A | * | 9/1999 | Saito et al. .............. | 701/55 X |

FOREIGN PATENT DOCUMENTS

| | | |
|---|---|---|
| DE | 39 22 051 A1 | 1/1991 |
| DE | 39 41 999 C2 | 6/1991 |
| DE | 44 09 122 A | 2/1995 |
| EP | 0 339 664 B1 | 11/1989 |
| EP | 0 433 603 A | 6/1991 |
| EP | 0 566 399 A | 10/1993 |
| EP | 0 790 441 A | 8/1997 |

* cited by examiner

*Primary Examiner*—Charles A Marmor
*Assistant Examiner*—Ha Ho
(74) *Attorney, Agent, or Firm*—Davis & Bujold, P.L.L.C.

(57) ABSTRACT

In a process for controlling an automatic gearbox, an electronic gear box control (13) calculates in a first mode of operation a driving activity and determines the set gradient of the gear box input speed of rotation depending on the driving activity. In a second mode of operation, the electronic gear box control selects a special program among a plurality of special programs and determines the set gradient of the gear box input speed of rotation depending on the selected special program.

14 Claims, 9 Drawing Sheets

| Clutch-Logic | | | | | | | | |
|---|---|---|---|---|---|---|---|---|
| POS/GEAR | Clutch | | | | | | | Free Wheel |
|  | A | B | C | D | E | F | G | 1. G. |
| R = R-Gear |  | * |  | * |  |  | * |  |
| N = Neutral |  |  |  |  |  | * | * |  |
| D, 1. Gear | * |  |  |  |  |  | * | * |
| D, 2. Gear | * |  | * |  |  |  | * |  |
| D, 3. Gear | * |  | * |  |  | * |  |  |
| D, 4. Gear | * |  |  |  | * | * |  |  |
| D, 5. Gear |  |  | * |  | * | * |  |  |
| 1, 1. Gear | * |  |  | * |  |  | * | * |

\* = active

Fig. 2

PROCESS FOR CONTROLLING AN AUTOMATIC GEARBOX

BACKGROUND OF THE INVENTION

The invention relates to a process for controlling an automatic transmission where an electronic transmission control, during a gear shift, determines the actual gradient from a transmission input rotational speed by comparing the actual with a standard value and determining the divergence. The clutches involved in the gear shift are then regulated so that the divergence is reduced between actual and set gradient of the transmission input rotational speed.

SUMMARY OF THE INVENTION

In automatic transmissions, the shift time determines the comfort of a gear shift. Shift time is understood as the space of time during which a transmission input rotational speed changes from a rotational speed level of a first reduction ratio to a rotational speed level of a second rotational speed ratio. Shift time that is too short causes a definite jolt. A shift time that is too long causes an excessively great heat input in the clutches involved in the gear shift. To this extent, the shift time represents a compromise between the two extremes mentioned above. A process for control/regulation of a gear shift is proposed, e.g. in EP-PS 0 339 664. In this process, shift time is adjusted by calculating an actual gradient from the transmission input rotational speed and comparing it to a set gradient.

In practice, however, it has been demonstrated that many drivers subjectively find bad constant shift time. Therefore, the problem which the invention solves is to more intimately combine the behavior of the automatic transmission with the driver's behavior.

A first inventive solution consists of a first mode of driving in which electronic transmission control cyclically calculates driving activity from input variables of the vehicle and the driver, and changes the set gradient of the transmission input rotational speed according to the driving activity. In a second mode of driving, the electronic transmission control selects a special program from several, and changes the set gradient of the transmission input rotational speed according to the selected special program. As stated in claim 2, in the first mode of driving, the set gradient is changed in the sense that a high set gradient is adjusted during high driving activity.

The inventive solution and the development thereof offer the advantage that a driver's behavior determines the shift sequences. In comfort-oriented driving mode, there results smooth, long gear shifts. From a sport mode of driving short gear shifts result. In automatic transmissions having a so-called "intelligent" shift program, a driving activity is calculated for selecting the shift points. Such processes have been disclosed, e.g. in DE-PS 39 22 051 and DE-OS 39 41 999. The inventive solution results in the added advantages that the already determined driving activity can be returned to and the inventive solution can be economically integrated via existing software.

In one development of the invention, it is proposed that in the second mode of operation, the set gradient of the transmission input rotational speed be changed in direction of lower values when one of the following special programs is active: winter program, slip regulation of the input gears, cruise control function, or city program. The effect of the development is that the gear shifts are very smoothly performed and, e.g. in the winter program, unsafe driving situations are prevented.

In a further development of the invention, it is proposed that in the second mode of operation the set gradient of the transmission input rotational speed be changed in a direction of higher values, i.e. to a short shift time, when one of the special programs such as mountain/trailer, or downhill is active. An advantage results when driving uphill with a trailer when due to the short shift time after the gear shift, a sufficiently high acceleration capacity is available.

In a second inventive solution of the problem, it is proposed that the electronic transmission control change the set gradient of the transmission input rotational speed, depending on a shift program activated by means of a program selector switch. The inventive solution can be preferably used in conventional automatic transmissions. In conventional automatic transmissions, the driver can select, via a switch, e.g. between economical "E", sporting "S" and winter "W" programs.

BRIEF DESCRIPTION OF THE DRAWINGS

A preferred embodiment is shown in the Figures. Shown is:

FIG. 2 is a table of the clutch logic;

DESCRIPTION OF THE PREFERRED EMBODIMENT

Figure 1:
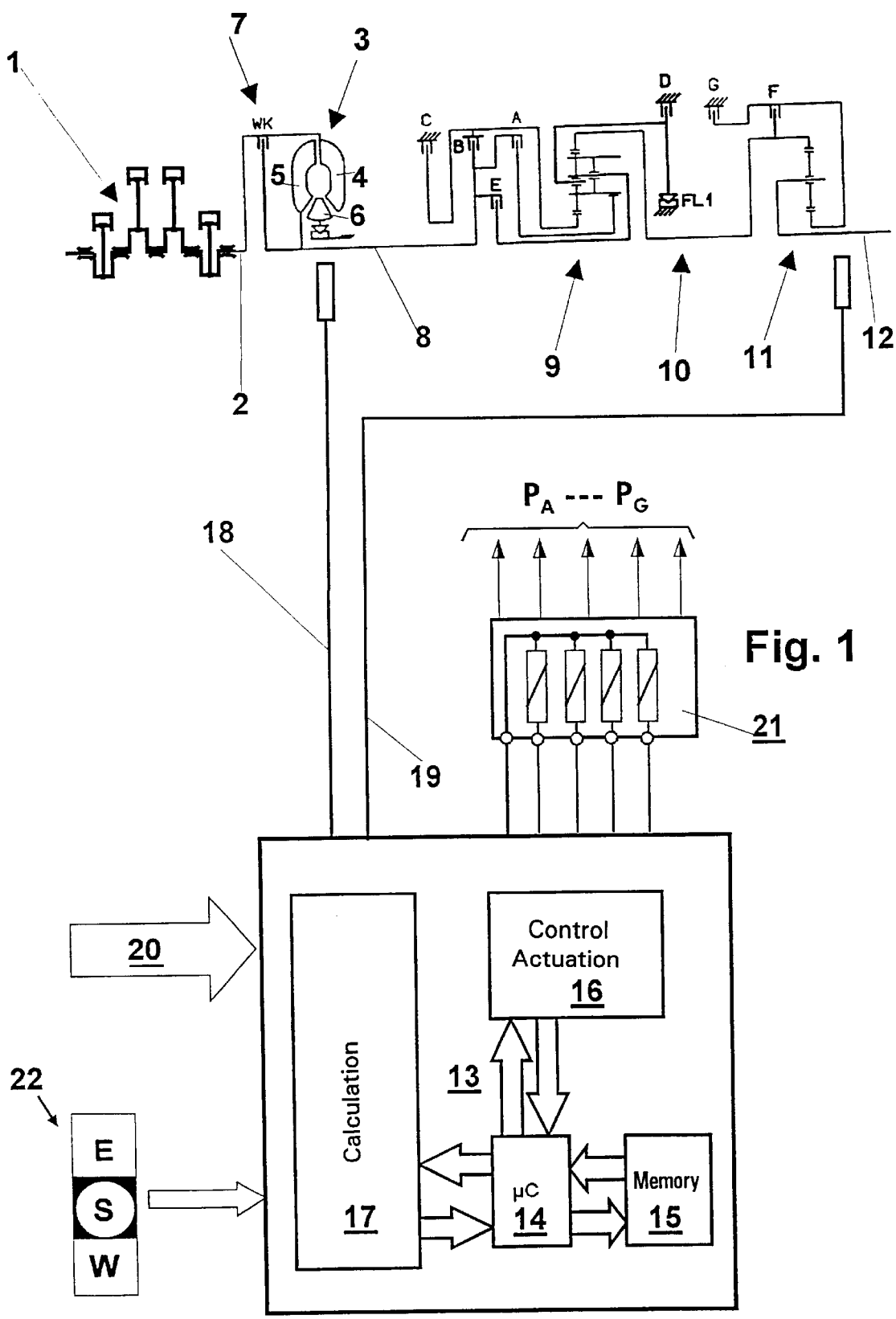
FIG. 1 is a system diagram.

FIG. 1 shows a system diagram of an automatic transmission. It consists of the mechanical part proper, a hydrodynamic torque converter 3, a hydraulic control unit 21 and an electronic transmission control 13. The automatic transmission is driven by an input unit 1, preferably an internal combustion engine, via an input shaft 2. This is non-rotatably connected with the impeller 4 of the hydrodynamic torque converter 3. As known already, the hydrodynamic torque converter 3 consists of an impeller 4, a turbine wheel 5 and a stator 6. Parallel with the hydrodynamic torque converter 3 is situated a torque converter clutch 7. The torque converter clutch 7 and the turbine wheel 5 lead to a turbine shaft 8. When the torque converter clutch 7 is actuated, the turbine shaft 8 has the same rotational speed as the input shaft 2. The mechanical part of the automatic transmission consists of clutches and brakes A to G, a free wheel 10 (FL1), a Ravigneaux set 9 and a rear-mounted planetary gear 11. The output takes place via a transmission output shaft 12. This leads to a differential (not shown) which, via two axle half shafts, drives the input gears of a vehicle (not shown). A gear step is defined via an adequate clutch/brake combination. The coordination of the clutch logic to the gear step can be seen in FIG. 2. For example, in a downshift from the fourth to the third gear, the brake C closes and the clutch E is deactivated. As further seen from Table 2, the gear shifts from the second up to the fifth ratio steps are each carried out as overlapping gear shifts. Since the mechanical part is not relevant for the understanding of the invention, a detailed description is omitted.

Depending on the input variables 18 to 20, the electronic transmission control 13 selects a corresponding driving step. The electronic transmission control 13 then activates a corresponding clutch/brake combination via the hydraulic control unit 21 where electromagnetic actuators are located. During the gear shifts, the electronic transmission control 13 determines the pressure curve of the clutches/brakes involved in the gear shift. On the electronic transmission control 13, there are shown as blocks in extensively simplified manner: micro-controller 14, memory 15, function block control actuators 16 and function block calculation 17. In the memory 15 are stored the data relevant to the transmission. Data relevant to the transmission are, e.g. programs, shift characteristic fields and characteristic values specific to the vehicle the same as diagnostic data. The memory 15 is usually designed as EPROM, EEPROM, or buffered RAM. In the function block calculation 17 are calculated from input variables the data relevant for a gear shift curve and the driving activity. The function block control actuators 16 serve to control the actuators located in the hydraulic control unit 21. Input variables 20 are fed to the electronic transmission control 13. Input variables 20 are, e.g. a variable representative of the driver's desired performance such as the accelerator pedal/throttle valve position, manual gear shift requirements, the signal of the torque generated by the internal combustion engine, the rotational speed or temperature of the internal combustion engine, etc. Data specific to the internal combustion engine are usually made available by a motor control unit. This is not shown in FIG. 1. As added input variables, the electronic transmission control 13 receives the rotational speed of the turbine shaft 18 and of the transmission output shaft 19. As an alternative to an intelligent system, FIG. 1 shows with reference numeral 22 a program selector switch so that the process can also be used for conventional automatic transmissions.

Figure 3:
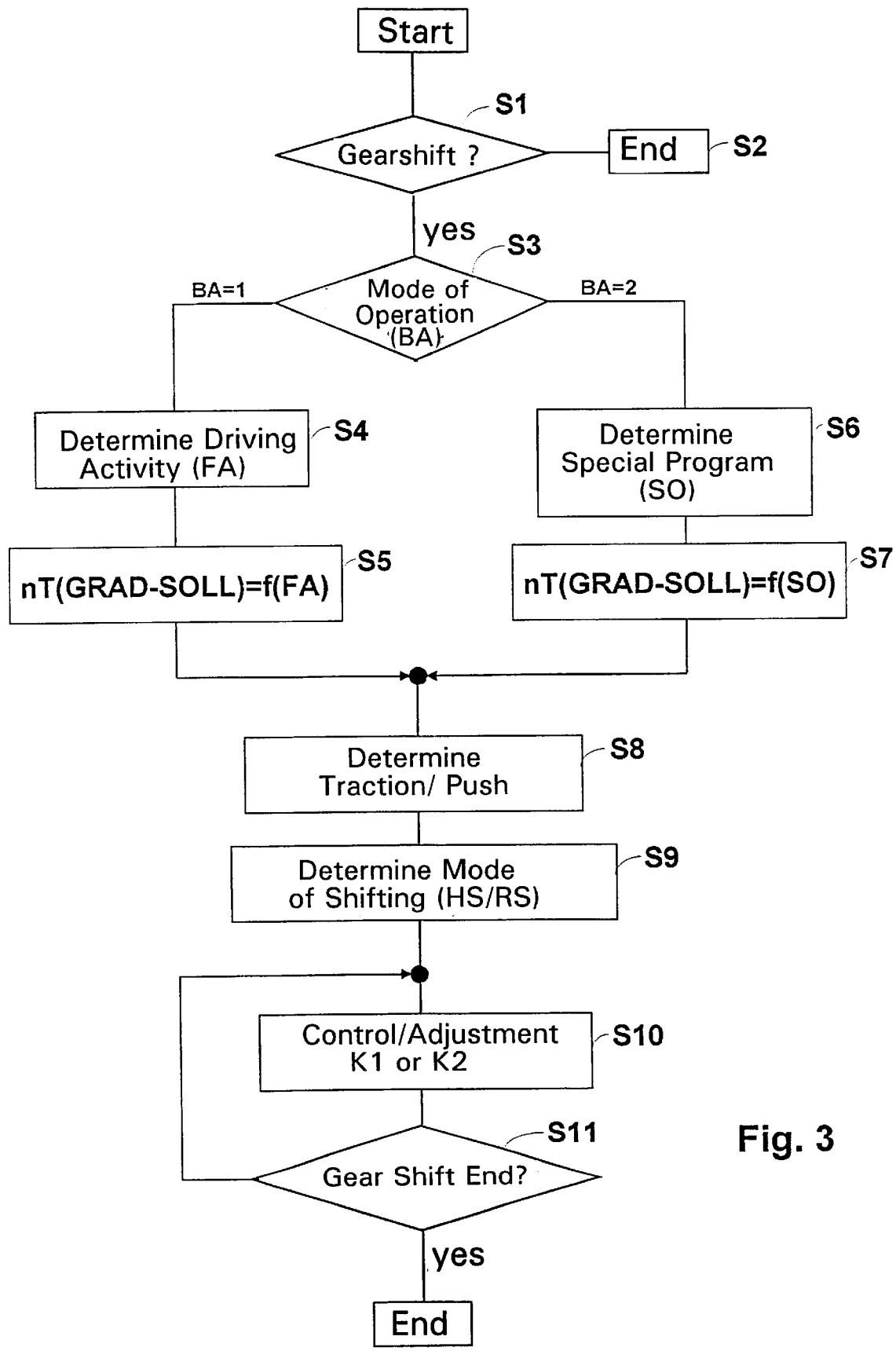
FIG. 3 is a program flow chart for the first solution.

FIG. 3 shows a program flow chart for the first inventive solution. It is preferably used in automatic transmissions having an intelligent shift program. Such an intelligent shift program has been disclosed, e.g. in DE-PS 39 22 051 and DE-OS 39 41 999. In the intelligent shift program, a driving activity FA is determined from variables specific to the vehicle and the driver's behavior. The driving activity FA ultimately determines the shift point of the automatic transmission. The program flow chart begins at step S1 with the question whether a gear shift is needed. If that is not the case, the program terminates with step S2. In case of positive result to the question, the mode of operation BA is questioned in step S3. If the result of the question is that the first mode of operation (BA=1) is active, the loop is traversed with S4 and S5. If established that the second mode of operation (BA=2) is active, the loop is traversed with S6 and S7. If in step S3, the result of the question is that the first mode of operation is active; in step S4, either the driving activity FA is determined, or the driving activity already calculated by the electronic transmission control to determine the shift points is used. In step S5, a gradient set value of the transmission input rotational speed nT(GRAD-SOLL) is then adjusted depending on the driving activity. In practice, this is implemented in a manner such that sport mode of operation results in a higher driving activity and thus a higher gradient set value of one in the sense of a shorter shift time. Conversely, a very economical mode of driving results in a lower driving activity and ultimately to a small gradient set value of the transmission input rotational speed. For safety reasons, the value range within which the gradient set value can be adjusted is defined by a maximum and minimum gradient value. Within the range, the gradient set value can be arbitrarily changed. In step S3, if the result of the question is that the second mode of operation (BA=2) is activated; step S6 then tests which special program is active. Special programs are: winter program, slip regulation of the input gears, cruise control function, city/trailer program, downhill program, and upshift prevention. Step S7 defines the gradient set value (GRAD-SOLL) of the transmission input rotational speed as a function of the special program. This is implemented in a manner such that the set gradient is changed to smaller values when either the winter program, the slip regulation of input gears, the cruise control function, or the city program is active. The set gradient is likewise adjusted to lower values when the special program upshift prevention terminates. As known, the special program upshift prevention forestalls the carrying out of a gear shift. This development prevents the driver, after the upshift prevention terminates (such as after traversing a curve), being surprised by too hard a gear shift. The set gradient of the transmission input rotational speed is changed in a direction of higher values, in the sense of a shorter shift time, when the mountain/trailer program or the downhill program is activated. It is thereby ensured that, e.g. when driving uphill with a trailer, a sufficiently high output torque is available soon after a traction downshift. Step S8 determines whether the gear shift develops as traction or pull shift. Step S9 determines whether an upshift or a downshift is required. Step S10 then controls/adjusts the clutches involved in the gear shift which, in an overlapping shift, are a first opening clutch K1 and a second closing clutch K2. Thereafter follows, in step S11, the question whether the gearshift end (e.g. the synchronization point), has been detected. If this is not the case, a holding pattern is passed through. If the end of the gear shift is detected, the program terminates.

Figure 4:
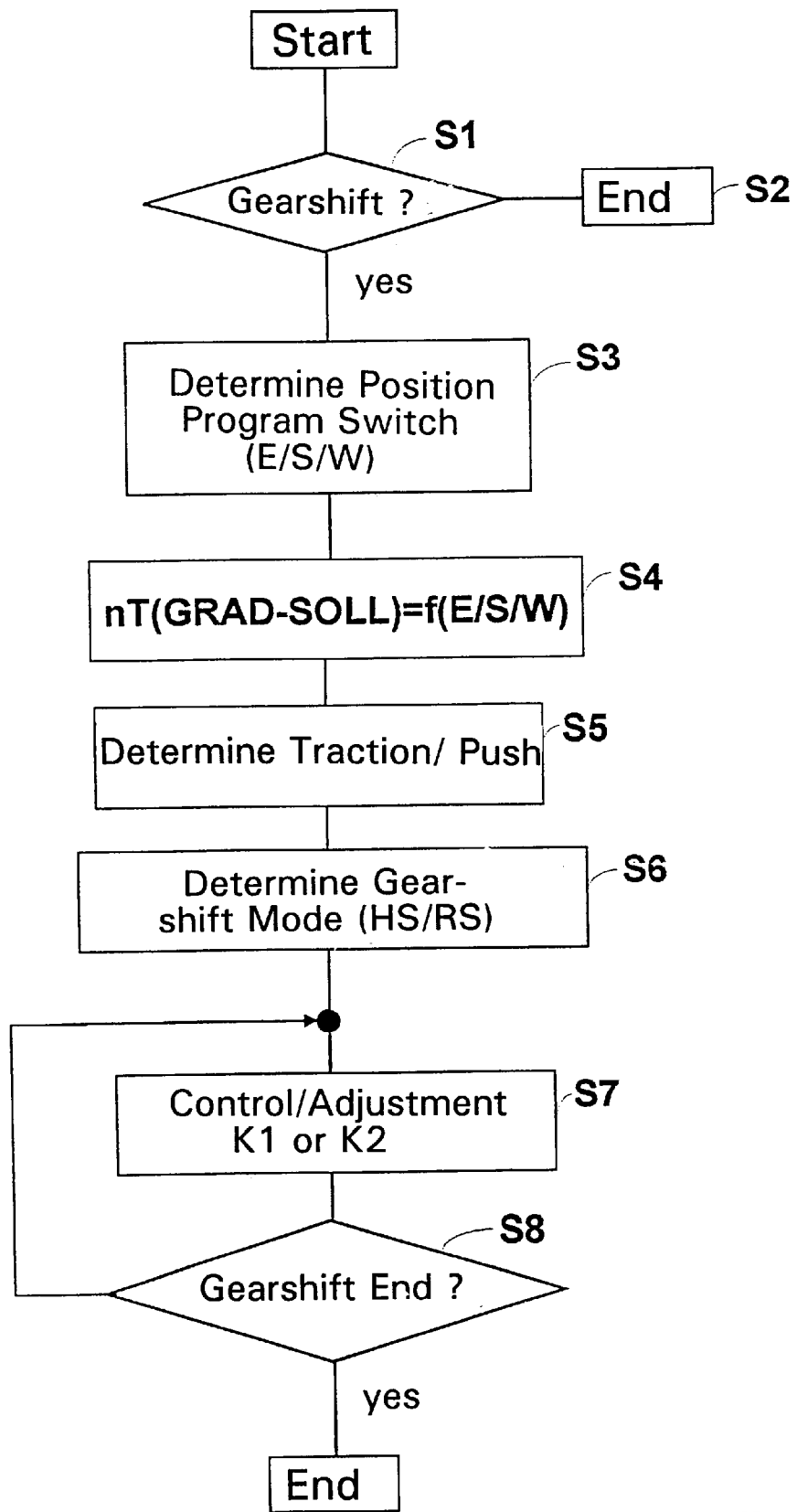
FIG. 4 is a program flow chart for the second solution.

FIG. 4 shows the program flow chart for the second invention solution. This program is preferably used in conventional automatic transmissions, wherein the driver can choose by means of a switch from three programs, usually an economic "E", a sport "S" and a winter "W" program. Up to step S3, the program flow chart is identical with that of FIG. 3 so what has been described there applies here. In step S3, the position of the program selector switch is determined. In step S4 is preset, depending on the selector switch of this program, the gradient set value nT(GRAD-SOLL) of the transmission input rotational speed. In practice, this is effected so that in the program switch positions "E" and "W", a very low set value of the gradient is preset in the sense of a long shift time. The steps S5 to S8 are identical with steps S8 to S11 of FIG. 3 so that what has been described there also applies here.

Figure 5A:
FIG. 5 is a time diagram for a downshift in traction.
Figure 5B:
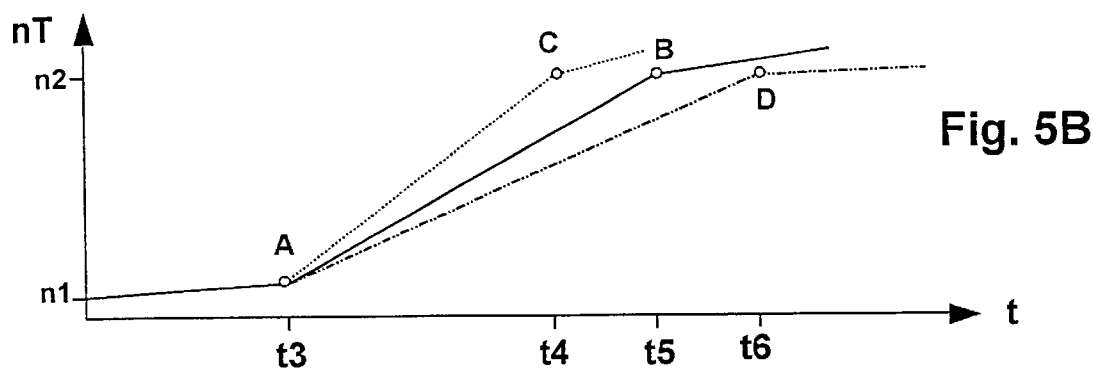
Figure 5C:
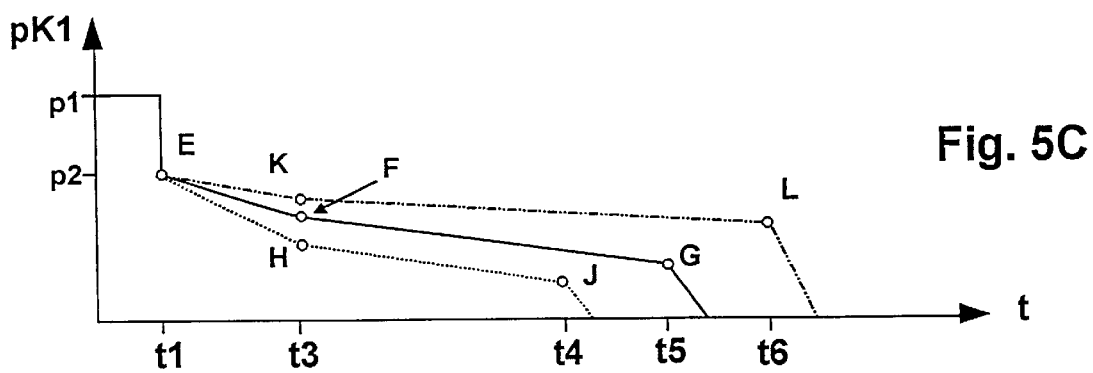

FIG. 5 shows a time diagram for a downshift in traction. FIG. 5 consists of the parts FIGS. 5A to 5D. Each one shows in the course of time:

FIG. 5A the shift command substantially issued by the electronic transmission control;

FIG. 5B the curve of the transmission input rotational speed nT;

FIG. 5C the pressure curve of the first disengaging clutch K1; and

Figure 5D:
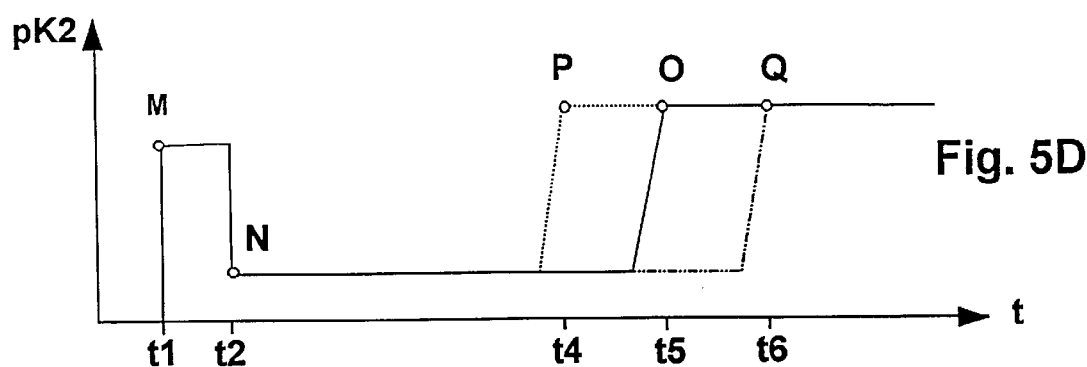

FIG. 5D the pressure curve of the second engaging clutch K2.

In FIGS. 5B, 5C and 5D, three case examples are shown wherein the same types of lines correspond to the same example.

In the first case example, shown in FIGS. 5B to 5D as a solid line, a compromise between a sporting and a comfortable shift sequence is shown. FIG. 5B thus corresponds to the curve path with the points A and B, FIG. 5C to the curve path with the points E, F and G, and FIG. 5D to the curve path with the points M, N and O. The sequence is as follows: at time t1 the electronic transmission control 13 issues the shift command substantially to the automatic transmission. Thereby the pressure level of the first clutch K1 is reduced from a first pressure level p1 to a second pressure level p2. Thereafter a negative pressure ramp begins for the first clutch up to time t3 at point F. Also between time t1 and time t2, the second clutch K2 is actuated with a high pressure level, rapid filling pressure. Thereafter begins the filling equalizing phase for the second clutch K2. As result of the reduced pressure level of the first clutch K1, the transmission input rotational speed nT begins to increase at time t3. In the space of time t3 to t5, the pressure level of the first clutch K1 is reduced according to a second negative pressure ramp. Shortly before time t5, the pressure level of the second clutch is intensively raised so that it takes over the load of the internal combustion engine when the transmission input rotational speed nT has reached the synchronization point at time t5 at point B. Thereafter the pressure level of the second clutch K2 remains constant. At time t5, the first clutch K1 is disengaged.

The second case example, shown in hatched lines in FIG. 5B to 5D, represents a gear shift sequence in sport mode of driving with high driving activity FA. In FIG. 5B, this corresponds to the curve path of points A and C, FIG. 5C the curve path of points E, H and J and, in FIG. 5D the curve path of points M, N, and P. Up to time t3, the curve path is identical with the first case example so that what has been described there applies here. The pressure level at point H of the first clutch K1 is lower than that at point F. As a consequence of this, the transmission input rotational speed nT begins at time t3 to rise more quickly than the first case example. For the first clutch K1, a negative pressure ramp, end point J, follows in the space of time t3/t4. Shortly before time t4, the pressure level of the second clutch K2 is quickly raised (pressure level point P), so that at the synchronization point, corresponding to point C in FIG. B, the clutch can reliably take over the load.

The third case example drawn in dot-dash line shows a comfortable gear shift sequence. In FIG. 5B, this corresponds to the curve path of points A, D. In FIG. 5C, this corresponds to the curve path of points E, K and L, and in FIG. 5D, this corresponds to the curve path of points M, N and Q. Up to time t3, the curve is identical. At time t3, the first clutch K1 has reached the pressure level of point K. The pressure level K is higher than that of point F. Consequently, the transmission input rotational speed nT begins to rise more slowly than in the first case example. For the first clutch K1, a negative pressure ramp acts in the time period t3 to t6 at point L. Shortly before time t6, the pressure level of the second clutch K2 is raised, corresponding to point Q. At time t6, the second clutch K2 takes over at synchronization point D the load of the internal combustion engine. In FIG. 5B, the curve path A, C corresponds to the maximum possible gradient GRAD(MAX) of the transmission input rotational speed nT. This results from the quickest possible uptake of the internal combustion engine with the condition that the first clutch K1 be disengaged. The curve path with the points A, D shows the smallest possible gradient GRAD(MIN) of the transmission input rotational speed nT. This results from the maximum admissible heat input of the second clutch K2. Between the two curve paths, depending on the driving activity FA, the gradient set value nT(GRAD-SOLL) of the transmission input rotational speed nT can be arbitrarily changed.

Figure 6A:
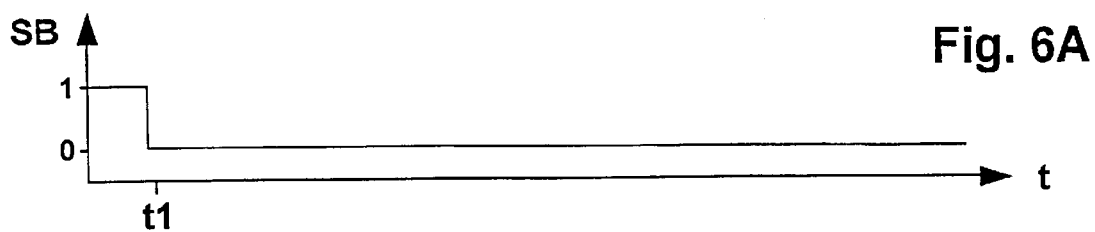
FIG. 6 is a time diagram for an upshift in traction.
Figure 6B:
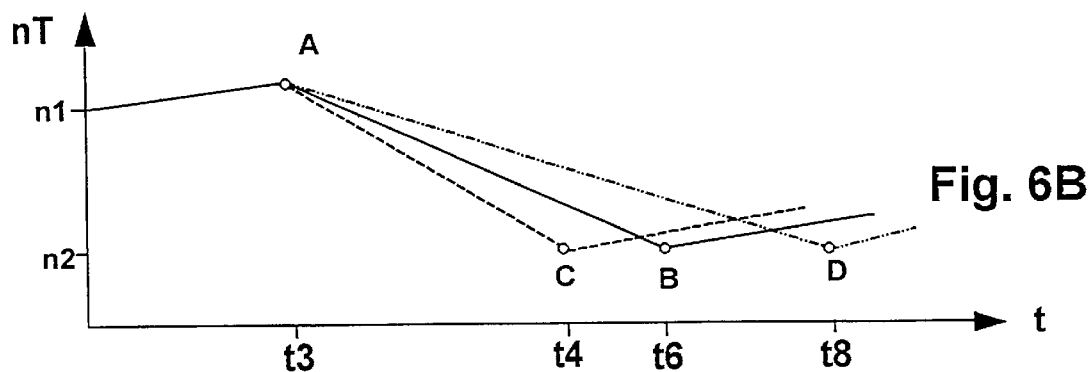
Figure 6C:
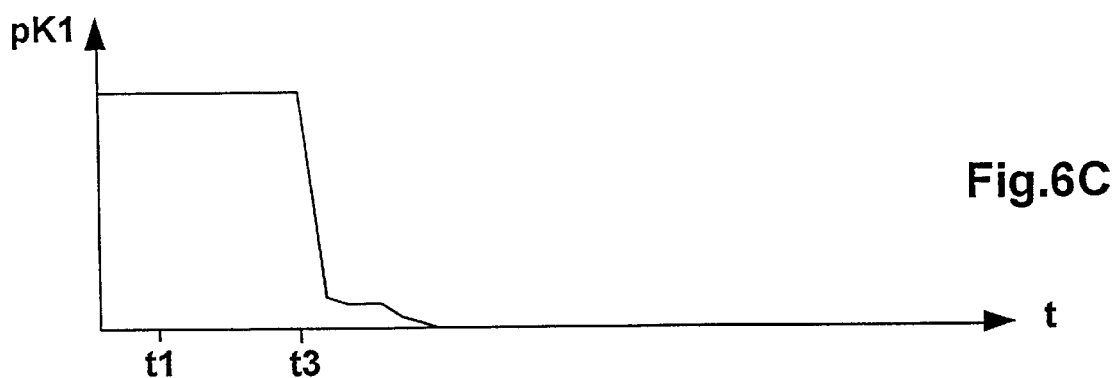

FIG. 6 shows a time diagram of an upshift in traction. In the course of time, the Figures each show:

FIG. 6A the shift command substantially issued by the electronic transmission control;

FIG. 6B the curve of the transmission input rotational speed nT;

FIG. 6C the pressure curve of the first disengaging clutch K1; and

Figure 6D:
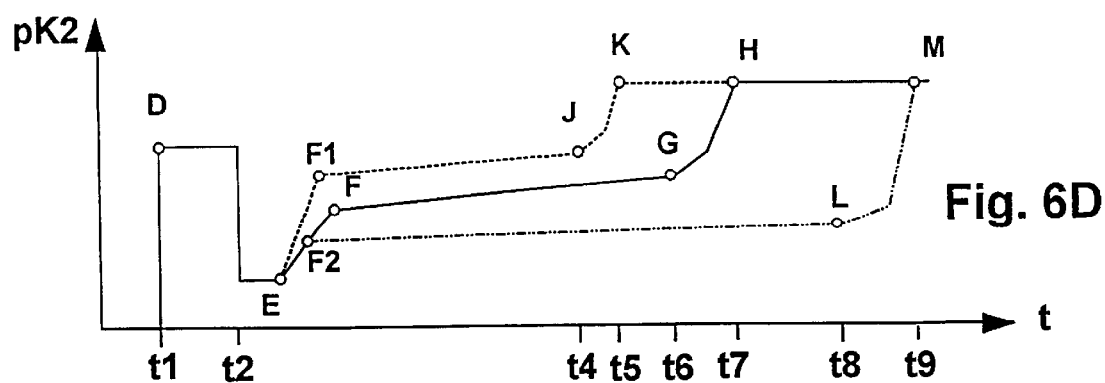

FIG. 6D the pressure curve of the second engaging clutch K2.

FIGS. 6B and 6D show three case examples wherein lines of the same type correspond to the same example.

The first case example, shown in FIGS. 6B and 6D as a solid line, is a compromise between a sport and a comfortable shift sequence. This corresponds in FIG. 6B to the curve path of points A, B. In FIG. 6D, this corresponds to the curve path of points D to H. The sequence is as follows: at time t1, the electronic transmission control 13 issues the shift command SB to the automatic transmission. The signal curve in FIG. 6A changes from one to zero. The second clutch K2 up to time t2 is filled with rapid filling pressure, pressure level corresponding to point D. A filling compensation phase and a pressure ramp, initial point E and end point F then follows. During the pressure ramp, the second clutch K2 begins to take over the load, which is detected by the transmission input rotational speed beginning to change at time t3 at point A. Since the second clutch K2 begins to take over the load, the first clutch K1 can be disengaged at time t3. Upon reaching the pressure level of point F of the second clutch K2, a second pressure ramp, end point G, begins for the clutch K2. The end point G or time t6 corresponds to the synchronization point of the second ratio step. This corresponds in FIG. 6B to point B. Upon reaching the synchronization point at time t6, the pressure level of the second clutch K2 is raised step by step up to the pressure level of point H at time t7. Thereafter the gear shift terminates.

The second case example shown in FIGS. 6B and 6D as hatched lines, represents a shift sequence in sport mode of driving. Up to the end of the filling compensation phase of the second clutch K2, the curve is identical with that of the first case example. However, the first pressure ramp of the second clutch K2, initial point E and end point F1, is here designed steeper compared to the first case example. The effect of this is that at time t3 at point A, the transmission input rotational speed changes with a larger gradient to the synchronization point of the second ratio step, the synchronization point corresponds to point C in FIG. 6B. When the pressure level F1 of the second clutch K2 is reached, a second pressure ramp begins and extends to time t4, end point J. Time t4 corresponds to the time when the transmission input rotational speed nT reaches the synchronization point C. Thereafter the pressure level of clutch K2 is raised slopingly up to the pressure level of point K, time t5. The gear shift terminates here.

The third case example shown in FIGS. 6B and 6D as dotted lines, represents a shift sequence in comfort-conscious mode of driving. Up to the end of the filling compensation phase of the second clutch K2, the curve is identical with that of the first case example. However, the first pressure ramp of the second clutch K2, initial point E, end point F2, is designed for shorter time than the pressure ramp in the first case example. Alternately, the first pressure ramp can be designed flatter. Thereafter from point F2 up to time t8, end point L, is the second pressure ramp of the second clutch K2. As result of the shorter or flatter first pressure ramp and the flatter second pressure ramp of the second clutch K2, the transmission input rotational speed nT changes after point A with a smaller gradient. Time t8 is reached when the transmission input rotational speed nT arrives at the synchronization point D of the second ratio step. Thereafter the pressure level of the second clutch K2 is slopingly raised to the pressure level of point M, at time t9. Thereafter the gear shift terminates.

Figure 7A:
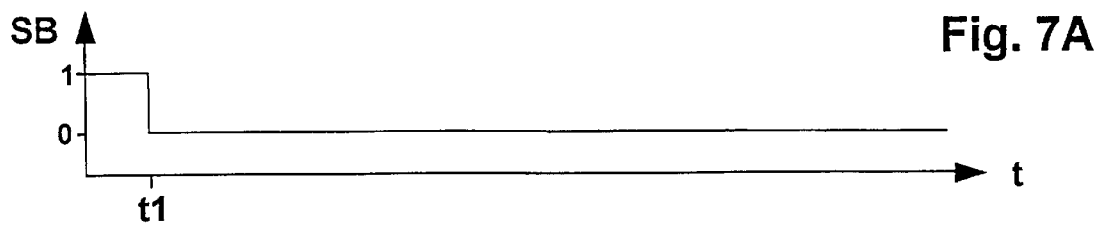
FIG. 7 is a time diagram for a downshift in push.
Figure 7B:
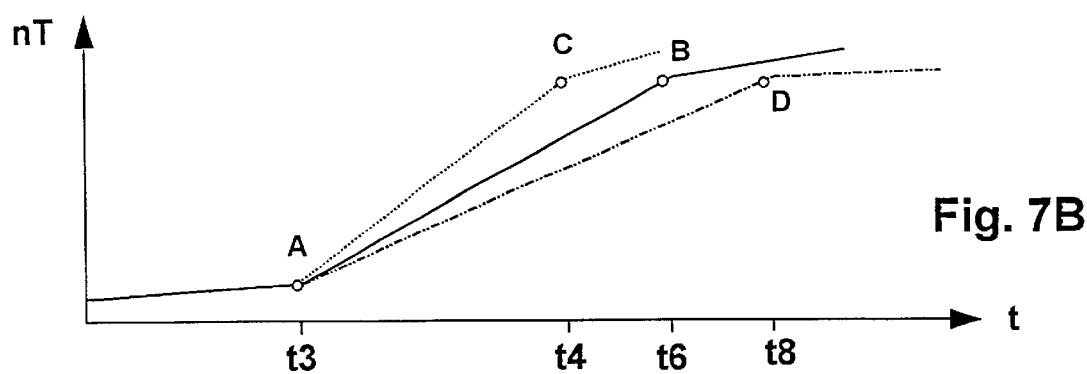
Figure 7C:
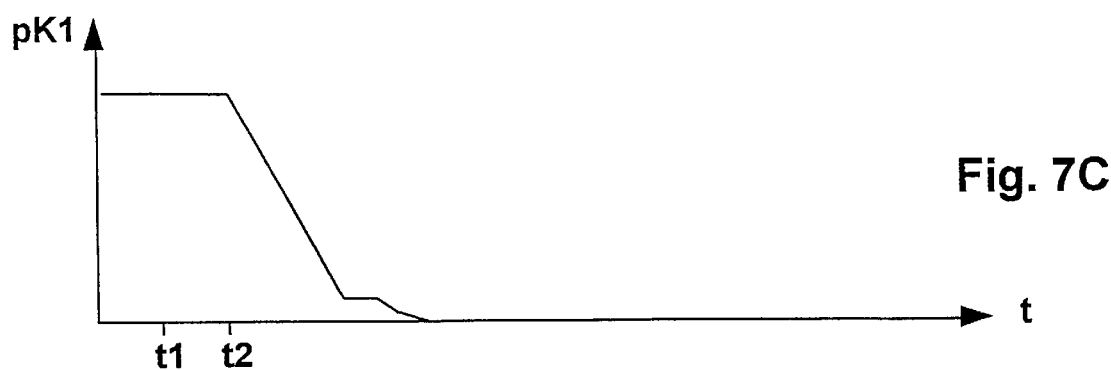

FIG. 7 shows a time diagram for a downshift in push. FIG. 7 consists of FIGS. 7A to 7D. Each Figure, respectively, shows in the course of time:

FIG. 7A the shift command SB issued by the electronic transmission control;

FIG. 7B the curve of the transmission input rotational speed nT;

FIG. 7C the pressure curve of the first disengaging clutch K1; and

Figure 7D:
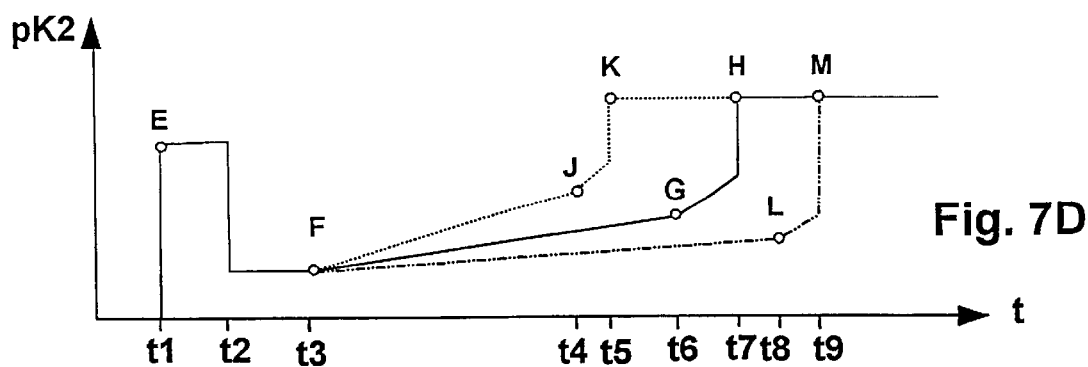

FIG. 7D the pressure curve of the second engaging clutch K2.

Each one of the FIGS. 7B and 7D shows three case examples wherein the same type of lines correspond to the same example.

The first case example, shown in FIGS. 7B and 7D as a solid line, represents a compromise between a sport and a comfortable shift sequence. In FIG. 7B, this corresponds to the curve path of points A, B. In FIG. 7D, this corresponds to the curve path of points E to H. The sequence is as follows: at time t1, the electronic transmission control 13 issues the shift command SB to the automatic transmission. The signal curve, in FIG. 7A, changes from one to zero. The second clutch K2 is loaded up to time t2 with rapid filling pressure. Thereafter follows up to time t3 a filling compensation phase followed by a first pressure ramp beginning at point F and ending at point G. At the end of the rapid filling phase of the second clutch K2 (i.e. at time t2), the pressure level of the first clutch K1 is slopingly reduced to zero. Consequently, the transmission input rotational speed nT begins to rise at time t3 at point A. The gradient of the transmission input rotational speed is determined, via the first pressure ramp, points F to G, of the second clutch K2. At time t6, the transmission input rotational speed nT reaches the synchronization point B of the second ratio step. At this time, the pressure of the second clutch K2 is then slopingly raised to the pressure level of point H. This is reached at time t7, thereafter the gear shift terminates.

The second case example, shown in FIGS. 7B and 7D as hatched lines, represents a shift sequence in sport mode of driving. This corresponds in FIG. 7B to the curve path of points A, C and, in FIG. 7D, to the curve path of points E, F, J and K. Up to time t3, the curve is identical with that of the first case example so that what has been described there applies here. At time t3 the first pressure ramp begins for the second clutch K2, between initial point F and end point J. This pressure ramp has a larger gradient than the pressure ramp of the first case example. Hereby the transmission input rotational speed nT is, therefore, quickly drawn to the synchronization point C of the second ratio step. The gradient of the transmission input rotational speed is raised in comparison with the first case example. After reaching the synchronization point C, the second clutch is slopingly raised from time t4 to the pressure level of point K. This is reached at time t5, thereafter the gear shift terminates.

The third case example, shown in FIGS. 7B and 7D as a dash-dot line, represents a comfortable shift sequence. In FIG. 7B, this corresponds to the curve path of points A, D. In FIG. 7D, this corresponds to the curve path of points E, F, L and M. Up to time t3, the curve is identical with the first and second examples. At time t3 the first pressure ramp begins for the second clutch K2 between initial point F and end point L. The first pressure ramp of the second clutch K2 is flatly laid out. The transmission input rotational speed nT changes less markedly than in the first and second case examples, and the gradient of the transmission input rotational speed is thus smaller. At time t8, the transmission input rotational speed nT reaches the synchronization point D of the second ratio step. Thereafter the pressure level of the second clutch K2 is slopingly raised up to the pressure level of the point M, t9 moment, thereafter the gear shift terminates.

Figure 8A:
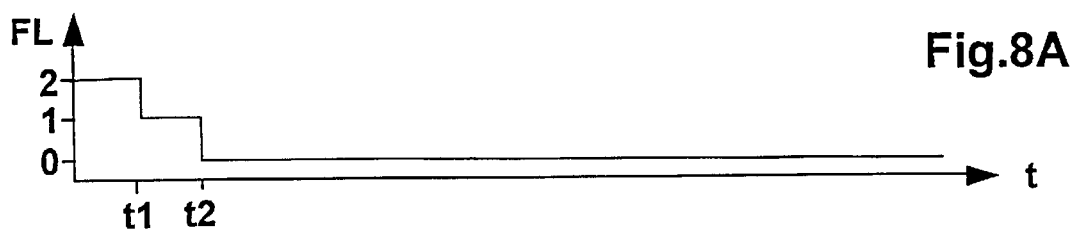
FIG. 8 is a time diagram for a double downshift in constant driving activity.
Figure 8B:
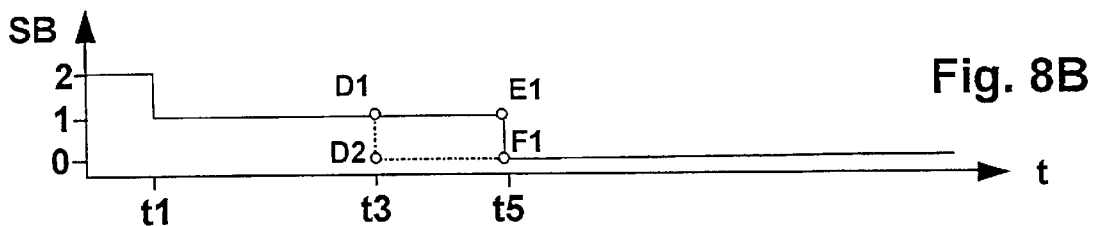
Figure 8C:
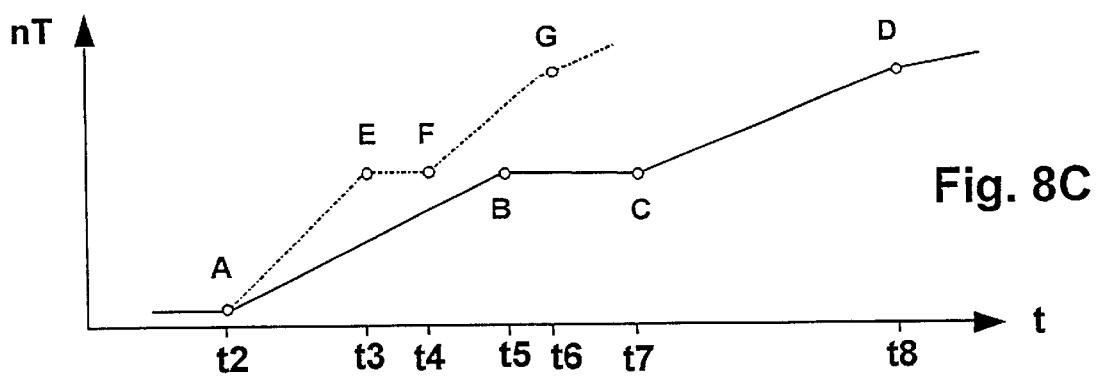
Figure 8D:
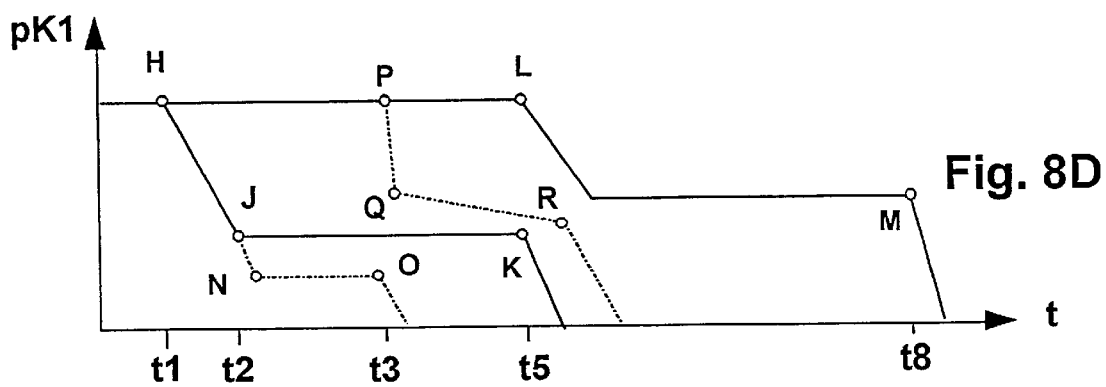

FIG. 8 shows a time diagram for a double downshift with constant driving activity. Here the Figures show in the course of time:

FIG. 8A the driver's desired performance FL;

FIG. 8B the shift command SB issued by the electronic transmission control;

FIG. 8C the curve of the transmission input rotational speed nT;

FIG. 8D the pressure curve of the disengaging clutch K1; and

Figure 8E:
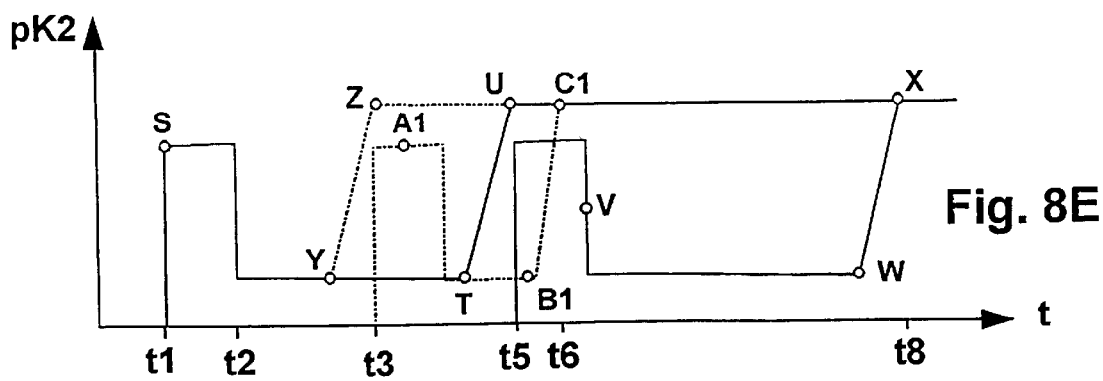

FIG. 8E the pressure curve of the engaging clutch K2.

FIGS. 8B to 8E show each of two case examples, lines of the same type correspond to the same example.

The first case example, shown in FIGS. 8B to 8E as solid lines, represents a compromise between a sport and a comfortable shift sequence. In FIG. 8B, this corresponds to the curve path of points D1, E1 and F1. In FIG. 8C, this corresponds to the curve path of points A to D. In FIG. 8D, this corresponds to the curve path of points H, J and K for the first disengaging clutch and to the curve path of points H, L and M for the second disengaging clutch. In FIG. 8E, this corresponds to the curve path of points S, T and U for the first closing clutch and the curve path of points V, W and X for the second closing clutch. At time t1, the driver desires, as shown in FIG. 8A, a first downshift and at time t2, a second downshift. As a result of the downshift desired performance, the electronic transmission control 13 issues a shift command SB. The signal level in FIG. 8B changes from two to one. As a result of the shift command, the pressure level of the first clutch K1, from point H slopingly decreases to point J. A rapid filling phase simultaneously begins for the second clutch K2, pressure level corresponding to point S, up to time t2. At time t2, the curve of the transmission input rotational speed nT begins at point A to change in the direction of the synchronization point B. The transmission input rotational speed nT reaches the synchronization point B at time t5. During the time period t2/t5, the pressure level of the first clutch K1 is kept constant. Alternately, the pressure curve of the first clutch K1 can also be designed to slightly drop. Shortly before reaching the synchronization point at time t5, the pressure level of the second clutch K2 corresponding to the pressure level of point T is slopingly raised to the pressure level at point U. The pressure level of point U is reached at time t5 so that the second clutch K2 can reliably take over the load of the internal combustion engine at synchronization point B. At time t5, the first downshift is terminated. Upon detection of synchronization point B, the electronic transmission control issues the shift command for the second downshift. The signal level in FIG. 8B changes from one to zero. As a result of the downshift command, the pressure level of the first clutch K1 (the second opening clutch), slopingly decreases from point L. Simultaneously the second clutch K2 (the second closing clutch), begins the rapid filling phase followed by a filling compensation phase which ends in point W. At time t7, the transmission input rotational speed nT begins from point C to rise to the new synchronization point D. Shortly before reaching the synchronization point, at time t8, the pressure level of the second clutch K2 slopingly rises to the pressure level at point X so that at time t8 it can reliably take over the load of the internal combustion engine at the synchronization point D. Likewise at time t8, the first clutch K1 is disengaged at point M. Thereafter the gearshift ends.

In the second case example drawn in hatched line, a sport shift sequence is shown. In FIG. 8B, this corresponds to the curve path of points D1, D2 and F1. In FIG. 8C, this corresponds to the curve path of points A, E, F and G. In FIG. 8D, this corresponds to the curve path of points H, N and O for the first opening clutch and the curve path of points H, P, Q and R for the second opening clutch. In FIG. 8E, this corresponds to the curve path of points S, Y, Z and U for the first engaging clutch and the curve path of points A1, B1 and C1 for the second engaging clutch. Up to time t2, the sequence is identical with the one of the first case example, but unlike the first case example, the negative pressure ramp begun for the first clutch K1 at point H is reduced to the pressure level at point N. The transmission input rotational speed nT thereby changes more quickly from point A than in the first case example. Shortly before reaching the synchronization point at point E, the second clutch K2 is guided from the pressure at point Y to the pressure level at point Z so that at time t3, it can reliably take over the load of the internal combustion engine at the synchronization point. Simultaneously at time t3. the first clutch K1 is disengaged at point O. At time t3, the electronic transmission control, similarly, issues the downshift command SB for the second downshift. The second clutch K2 is filled with rapid filling pressure, pressure level corresponding to point A1. Also at time t3, the pressure level of the first clutch K1 is reduced from point P to point Q. As a result of the dead time of the hydraulic system, only at time t4 at point F does the transmission input rotational speed nT begin to change in direction of the new synchronization point G. Shortly before reaching the synchronization point G, the pressure level of the second clutch K2 is raised from the pressure level of point B1 to point C1 in order to reliably take over the load of the internal combustion engine at the synchronization point G. The synchronization point G is reached at time t6 allowing the first clutch to be disengaged at point R, thereafter the gear shift terminates.

As shown in FIG. 8C, the gradient of the transmission input rotational speed can thus be changed, depending on the driving activity between the two extreme curve paths, namely, A, B, C and D and A, E, F and G.

Figure 9A:
FIG. 9 is a time diagram for a double downshift in changing driving activity.
Figure 9B:
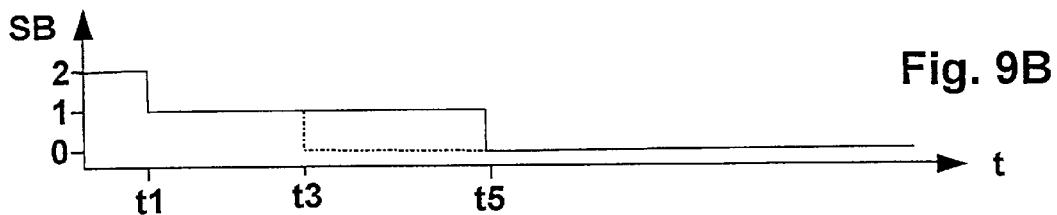
Figure 9C:
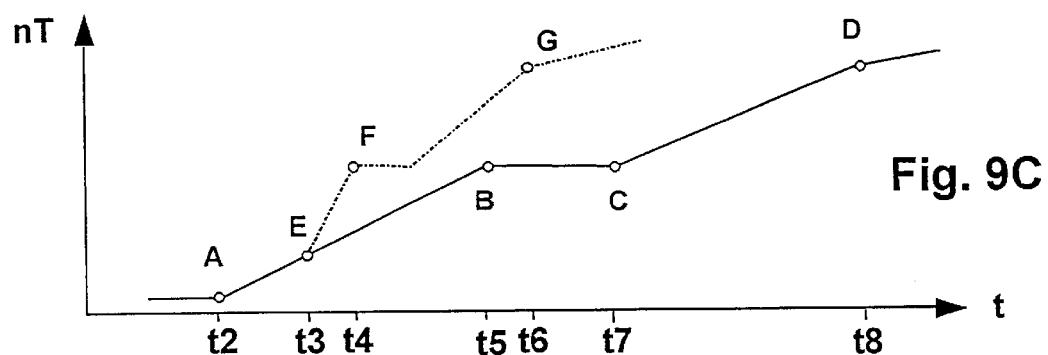
Figure 9D:
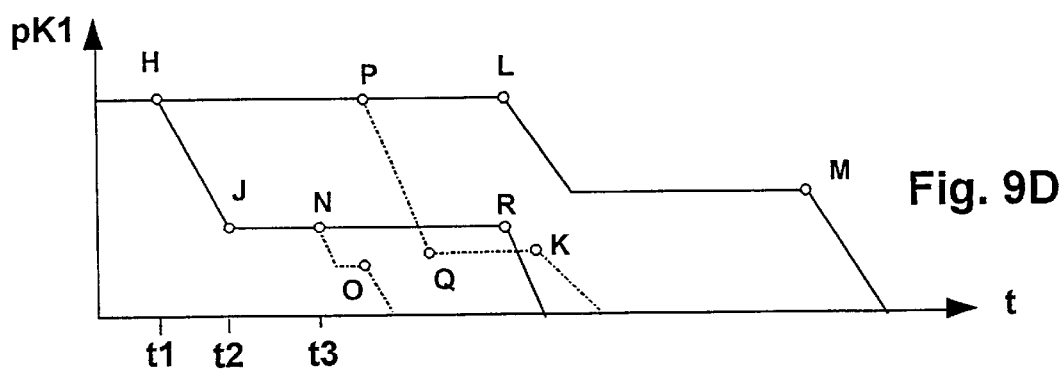

FIG. 9 shows a time diagram for a double downshift. In this representation it has been assumed that the driving activity changes during the gear shift. The Figures show in the course of time:

FIG. 9A the driver's desired performance FL;

FIG. 9B the shift command SB;

FIG. 9C the curve of the transmission input rotational speed nT;

FIG. 9D the pressure curve of the first clutch K1; and

Figure 9E:
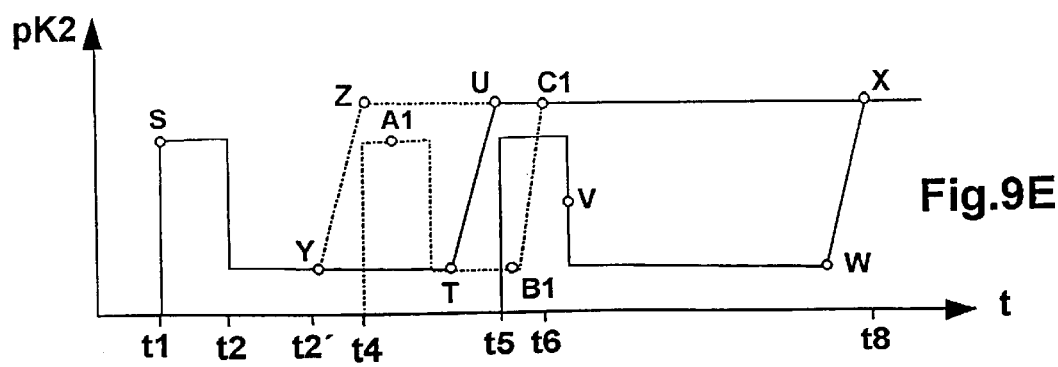

FIG. 9E the pressure curve of the second clutch K2.

In FIGS. 9B to 9E, two case examples are again shown. The first case example, drawn as solid line, corresponds to the first case example of FIG. 8 so that a new description is omitted. At time t3, the driver desires a second downshift. In FIG. 9A, the signal level FL changes from one to zero and the electronic transmission control issues the shift command SB. This is shown in FIG. 9B by the signal level changing from one to zero. It is now assumed that in the time period t1 to t3, the driving activity FA has increased. As result of the shift command SB the pressure level of the first clutch K1 from point N slopingly decreases to the pressure level of point O. At time t2, the pressure level of the second clutch K2 slopingly increases according to the line YZ so that at the synchronization point F, it can reliably take over the load at time t4. When reaching the synchronization point at time t4, the second clutch K2 (the second engaging clutch), is filled by rapid filling pressure, to the pressure level at point A1. Likewise at time t4, the pressure level of the first clutch K1 (the second disengaging clutch here), decreases from point P down to the pressure level of point Q. Consequently, the transmission input rotational speed nT changes overtime in direction of the new synchronization point G. Shortly before reaching the synchronization point, the pressure level of the second clutch K2 is guided from the pressure level of point B1 to the pressure level of point C1 so that it can reliably take over the load at the synchronization point G. At time t6, synchronization point G is reached, thereafter the gear shift terminates.

As shown in FIG. 9C, a change of the driving activity immediately leads to a change in the gradient of the transmission input rotational speed. A higher activity causes a larger gradient since that the shift time is reduced.

In FIGS. 5 to 9, controlled pressure sequences of the first and second clutch K1 or K2 are shown. In practice, an adjustment process can be superimposed on the control process. The adjustment process regulates the gradient of the transmission input rotational speed nT. The first clutch K1 would thus be additionally adjusted in FIG. 5C; in FIGS. 6D and 7D, the second clutch K2; and in FIG. 8D, the first clutches K1.

REFERENCE NUMERALS 1 input unit
2 input shaft
3 hydrodynamic torque converter
4 impeller
5 turbine wheel
6 stator
7 torque converter clutch
8 turbine shaft
9 Ravigneaux set
10 free wheel FL1
11 planetary gear set
12 transmission output shaft
13 electronic transmission control
14 micro-controller
15 memory
16 function block control actuators
17 function block calculation
18 signal of turbine rotational speed
19 signal of transmission output rotational speed
20 input variables
21 hydraulic control unit
22 program selector switch

What is claimed is:

1. A process for controlling an automatic transmission, having engageable and disengageable clutches, in which a control means (13), during a gear shift, determines an actual gradient (nT(GRAD-IST)) of the automatic transmission from a measured transmission input rotational speed (nT) and detects therefrom a divergence from a set gradient of the transmission input rotational speed (nT(GRAD-SOLL)) and adjusts the engageable and disengageable clutches (K1, K2) of the automatic transmission involved in the gear shift so that an actual divergence from the set gradient of the transmission input rotational speed is reduced; the process comprising the steps of:

providing the control means (13) with a first mode of operation and a second mode of operation;

the control means (13), when operating in the first mode of operation, cyclically calculating a driving activity (FA) from input variables; and changing the set gradient of the transmission input rotational speed (nT (GRAD-SOLL)), during operation in the first mode of operation, depending on the driving activity (FA);

the control means when in the second mode of operation, selecting a special program (SKL(SONDER)) from a plurality of control programs; and changing the set gradient (nT(GRAD-SOLL)) of the transmission input rotational speed, during operation in the second mode of operation, depending on the selected special program (SKL(SONDER)) without regard to the driving activity (FA) when within a maximum and a minimum range of the set gradient.

2. The process for controlling an automatic transmission according to claim 1, further comprising the step of changing, during operation in the first mode of operation, the set gradient of the transmission input rotational speed (nT (GRAD-SOLL)) so that an increase in driving activity (FA) generates a larger set gradient.

3. The process for controlling an automatic transmission according to claim 2, further comprising the step of defining a range for the set gradient which has a minimum value (GRAD(MIN)) and a maximum value (GRAD(MAX)), and changing the set gradient of the transmission input rotational speed (nT(GRAD-SOLL)) to a value lying within the range.

4. The process for controlling an automatic transmission according to claim 1, further comprising the step of, during operation in the second mode of operation, changing the set gradient of the transmission input rotational speed (nT (GRAD-SOLL)) to a lower value when one of the following special programs is activated:

a winter program;

a slip adjustment of the input gears;

a cruise control function;

a city program; and an upshift prevention program.

5. The process for controlling an automatic transmission according to claim 4, further comprising the step of, during operation in the second mode of operation and at the end of the upshift prevention program, changing the set gradient of the transmission input rotational speed (nT(GRAD-SOLL)) to a lower value prior to a subsequent gear shift.

6. The process for controlling an automatic transmission according to claim 1, further comprising the step of, during operation in the second mode of operation, changing the set gradient of the transmission input rotational speed (nT (GRAD-SOLL)) to a higher value when one of the following special programs is activated:

a mountain/trailer program; and a downhill program.

7. The process for controlling an automatic transmission according to claim 1, further comprising the step of changing the set gradient of the transmission input rotational speed (nT(GRAD-SOLL)), via the control means (13), and the change being dependent upon a shift program (E/S/W) activated by means of a program selector switch (22) (nT(GRAD-SOLL))=f(E/S/W)).

8. A process for controlling an automatic transmission, having engageable and disengageable clutches, in which an electronic transmission control (13), during a gear shift, determines an actual gradient (nT(GRAD-IST)) of the automatic transmission from a measured transmission input rotational speed (nT) and detects therefrom a divergence from a set gradient of the transmission input rotational speed (nT(GRAD-SOLL)) and adjusts the engageable and disengageable clutches (K1, K2) of the automatic transmission involved in the gear shift so that an actual divergence from the set gradient of the transmission input rotational speed is reduced; the process comprising the steps of:

providing the electronic transmission control (13) with a first mode of operation and a second mode of operation;

the electronic transmission control (13), when operating in the first mode of operation, cyclically calculating a driving activity (FA) from input variables; and changing the set gradient of the transmission input rotational speed (nT(GRAD-SOLL)), during operation in the first mode of operation, depending on the driving activity (FA);

the electronic transmission control, when in the second mode of operation, selecting a special program (SKL (SONDER)) from a plurality of control programs; and changing the set gradient (nT(GRAD-SOLL)) of the transmission input rotational speed, during operation in the second mode of operation, depending on the selected special program (SKL(SONDER)) without regard to the driving activity (FA) when within a maximum and a minimum range of the set gradient.

9. The process for controlling an automatic transmission according to claim 8, further comprising the step of changing, during operation in the first mode of operation, the set gradient of the transmission input rotational speed (nT (GRAD-SOLL)) so that an increase in driving activity (FA) generates a larger set gradient.

10. The process for controlling an automatic transmission according to claim 9, further comprising the step of defining a range for the set gradient which has a minimum value (GRAD(MIN)) and a maximum value (GRAD(MAX)), and changing the set gradient of the transmission input rotational speed (nT(GRAD-SOLL)) to a value lying within the range.

11. The process for controlling an automatic transmission according to claim 8, further comprising the step of, during operation in the second mode of operation, changing the set gradient of the transmission input rotational speed (nT (GRAD-SOLL)) to a lower value when one of the following special programs is activated:

a winter program;

a slip adjustment of the input gears;

a cruise control function; and a city program.

12. The process for controlling an automatic transmission according to claim 8, further comprising the step of, during operation in the second mode of operation and at the end of a special upshift prevention program, changing the set gradient of the transmission input rotational speed (nT (GRAD-SOLL)) to a lower value prior to a subsequent gear shift.

13. The process for controlling an automatic transmission according to claim 8, further comprising the step of, during operation in the second mode of operation, changing the set gradient of the transmission input rotational speed (nT (GRAD-SOLL)) to a higher value when one of the following special programs is activated:

a mountain/trailer program; and a downhill program.

14. The process for controlling an automatic transmission according to claim 8, further comprising the step of changing the set gradient of the transmission input rotational speed (nT(GRAD-SOLL)), via the electronic transmission control (13), and the change being dependent upon a shift program (E/S/W) activated by means of a program selector switch (22) (nT(GRAD-SOLL))=f(E/S/W)).

* * * * *